United States Patent
Schillegger

(12) 
(10) Patent No.: US 6,652,108 B1
(45) Date of Patent: Nov. 25, 2003

(54) DRIVE DEVICE FOR A VEHICLE ADJUSTABLE REAR-VIEW MIRROR USING A SELF-CALIBRATION POTENTIOMETER

(75) Inventor: Peter Schillegger, Nestelbach (AT)

(73) Assignee: Magna Auteca AG (AT)

( * ) Notice: Subject to any disclaimer, the term of this patent is extended or adjusted under 35 U.S.C. 154(b) by 13 days.

(21) Appl. No.: 10/031,544
(22) PCT Filed: Jul. 18, 2000
(86) PCT No.: PCT/EP00/06880
§ 371 (c)(1),
(2), (4) Date: Mar. 20, 2002
(87) PCT Pub. No.: WO01/07291
PCT Pub. Date: Feb. 1, 2001

(30) Foreign Application Priority Data

Jul. 21, 1999 (DE) .......................................... 199 34 905

(51) Int. Cl.⁷ .............................................. G02B 7/182
(52) U.S. Cl. ........................ 359/877; 359/871; 359/876; 359/879
(58) Field of Search ................................ 359/223, 225, 359/226, 549, 843, 871, 872, 873, 874, 881; 248/466, 475.1, 479, 484, 485, 486, 487; 310/92, 93, 94, 95, 96, 97, 98, 99, 100, 101, 102, 103, 104, 105, 106, 107, 108, 109 110

(56) References Cited

U.S. PATENT DOCUMENTS 4,670,679 A 6/1987 Koot et al.
5,467,230 A * 11/1995 Boddy et al. ................ 359/874
6,254,242 B1 * 7/2001 Henion et al. ............... 359/872
6,341,536 B1 * 1/2002 Guttenberger et al. ..... 74/89.18

FOREIGN PATENT DOCUMENTS

| EP | 0 528 418 A1 | 2/1993 |
| EP | 0 684 452 A2 | 4/1995 |
| EP | 0 793 078 A1 | 9/1997 |
| EP | 0 926 804 A1 | 6/1999 |
| NL | 9200412 A | 5/1993 |
| WO | WO 98/31565 | 7/1998 |

* cited by examiner

Primary Examiner—Thong Nguyen
Assistant Examiner—Joshua L Pritchett
(74) Attorney, Agent, or Firm—Marshall & Melhorn, LLC

(57) ABSTRACT

A device for a vehicle adjustable rear-view mirror is provided, wherein the device includes a fixed portion as well as a mirror support capable of pivoting relative to the portion using a driving motor and at least one driving gear. Also a potentiometer is used for generating a signal that indicates the pivot angle between the fixed portion and the mirror support which is considered as a module. The potentiometer includes a resistive member and a wiper, one of which is coupled to a base member attached to the fixed portion while the other is connected through a friction coupling to the driving gear or to a rotating part that co-operates with the same. One of those two members comprises two abutments having an angular deviation that corresponds to the pivot angle, the fixed portion and the mirror support, while the other member comprises two counter-abutments that co-operate with said abutments.

20 Claims, 5 Drawing Sheets

DRIVE DEVICE FOR A VEHICLE ADJUSTABLE REAR-VIEW MIRROR USING A SELF-CALIBRATION POTENTIOMETER

BACKGROUND OF THE INVENTION

1. Field of the Invention

The invention relates to a drive device for an adjustable vehicle mirror, using a self-calibrating potentiometer, as well as to a self-calibrating potentiometer.

2. Discussion of Related Art

Drive devices for adjusting a rear-view mirror are known, for example from WO 98/31565, by means of which the rear-view mirrors are adjusted. In top-of-the-range automobiles, when the driver changes, not only the position of the driver's seat but also the position of the rear-view mirror, connected therewith, is adjusted to a driver-specific stored value, for which purpose a position signal is needed.

Potentiometers are used in simple electrical adjusting drives, if a position signal is required for controlling such a drive. In such adjusting drives, the driving wheel, for example a toothed wheel, meshes with a counter-toothing of the sub-assembly to be adjusted, which has two end positions. Slide resistor and sliding bow or slider of the potentiometer are, in potentiometers known from practice, securely connected on the one hand to the driving wheel and on the other hand to its base.

In order to obtain a position signal which is of some use, such known driving wheels have to be brought manually into one of the two end positions and mounted in such a way that the toothed wheel does not twist. Where space is tight, it is almost impossible, if not completely impossible, during installation to bring a toothed wheel into engagement with the counter toothed wheel without twisting. Even where this succeeds, the tolerances of the driven sub-assemblies here remain out of consideration, such that the adjustment is so imprecise that it cannot be designated as calibration.

SUMMARY OF THE INVENTION

It is thus the object of the present invention to create a drive device for an adjustable vehicle mirror using a potentiometer and to create a potentiometer itself, which are able to be standardized or calibrated with minimum technical outlay according to a method which is as simple as possible.

This object is achieved according to the invention by the features of the main claim and of the coordinated claim.

The drive device according to the invention for an adjustable vehicle mirror has at least one fixed portion and a mirror support, pivotable relative to the fixed portion by means of at least one driving motor and at least one driving toothed wheel, and a potentiometer to generate a signal indicating the pivoting angle between the fixed portion and the mirror support. The potentiometer here has at least one slide resistor and at least one slider or sliding bow, one of these two elements being securely connected to a base portion connected to the fixed portion, and the other of the two elements being connected via a slip clutch to the driving toothed wheel or to a swivel part co-operating with the driving toothed wheel. What is essential is that one of the two elements is connected via the slip clutch to the driving wheel or swivel part or the base portion, and the stops and counter-stops provided on both the elements carry the respective element along when first adjusted, such that this element is brought, exceeding the slipping moment of the slip clutch, into the positions corresponding to the end positions of the vehicle mirror to be adjusted. Thus the potentiometer can be installed in any position and the calibration can be undertaken quickly and easily when it is first put into operation. This is a purely mechanical and nevertheless very exact calibration, since it corresponds to the actual end positions of the mirror or mirror support to be adjusted, irrespective of their variations in dimension.

In a preferred embodiment of the invention, the slider is connected by means of a slip clutch to the driving toothed wheel or the swivel part and the slide resistor is securely connected to the base part and the base part has a nose which co-operates with stops of the slider. This arrangement is particularly advantageous because of the type of electrical connections and the particularly simple production and assembly of the parts.

As a development of the invention, the slider is a stamping which is circular in its basic shaper, and which comprises a flat section and at least one arcuate spring band bent out of the plane of the sector, the flat section being connected via the slip clutch to the driving toothed wheel or the swivel part, and having in addition two cutting edges which are oriented substantially radially and which form the stops. A stamped part of this kind can be produced in a single pressing stroke, is thus cheap and fulfils a plurality of functions simultaneously, slider, spring and slip clutch.

The slip clutch can here be formed from a central journal, forming the rotational axis of the driving toothed wheel or swivel part, and an internal toothing, the internal toothing being a component part of the small metal plate forming the slider or of a clamping ring fixing the slider, which are pressed onto the journal. Thus the slip clutch is produced practically automatically during assembly. The danger of "wearing out" does not exist, since it only slips during the initial calibration and otherwise is not stressed.

The potentiometer according to the invention is constructed in a particularly simple manner and is thus inexpensive and can be used for mass production. In particular it is suitable for drives which have to be constructed particularly small and in which the space is very tight.

The drive device according to the invention with the potentiometer according to the invention can be calibrated in a particularly simple process. For this purpose, the base part with the driving toothed wheel or the swivel part is installed together with the other drive elements, generally one or more electromotors with a step-down gear, in any position and connected electrically, it being thereby possible to carry out the fitting also automatically without special arrangements, thus saving time. After assembly, the standardization or calibration can be carried out without having to undertake any manual adjustment, either immediately or not until the vehicle is used for the first time. To this end the adjusting drive or the adjusting drive device is first switched in the one direction until the mirror support reaches its end position, generally predetermined by its installation. If, beforehand, stop and counter-stop of the potentiometer meet one another (then the potentiometer is already located in its end position), one of the elements slide resistor or slider is taken along against the force of the slip clutch, until the sub-assembly, i.e. the mirror support, has also reached its end position. Since it can be assembled in any way, this happens either when the first end position is reached or when the second end position is reached.

BRIEF DESCRIPTION OF THE DRAWING

Embodiments of the invention are shown in the drawing and are explained in greater detail in the following description. The figures show.

DESCRIPTION OF THE PREFERRED EMBODIMENT

Figure 1:
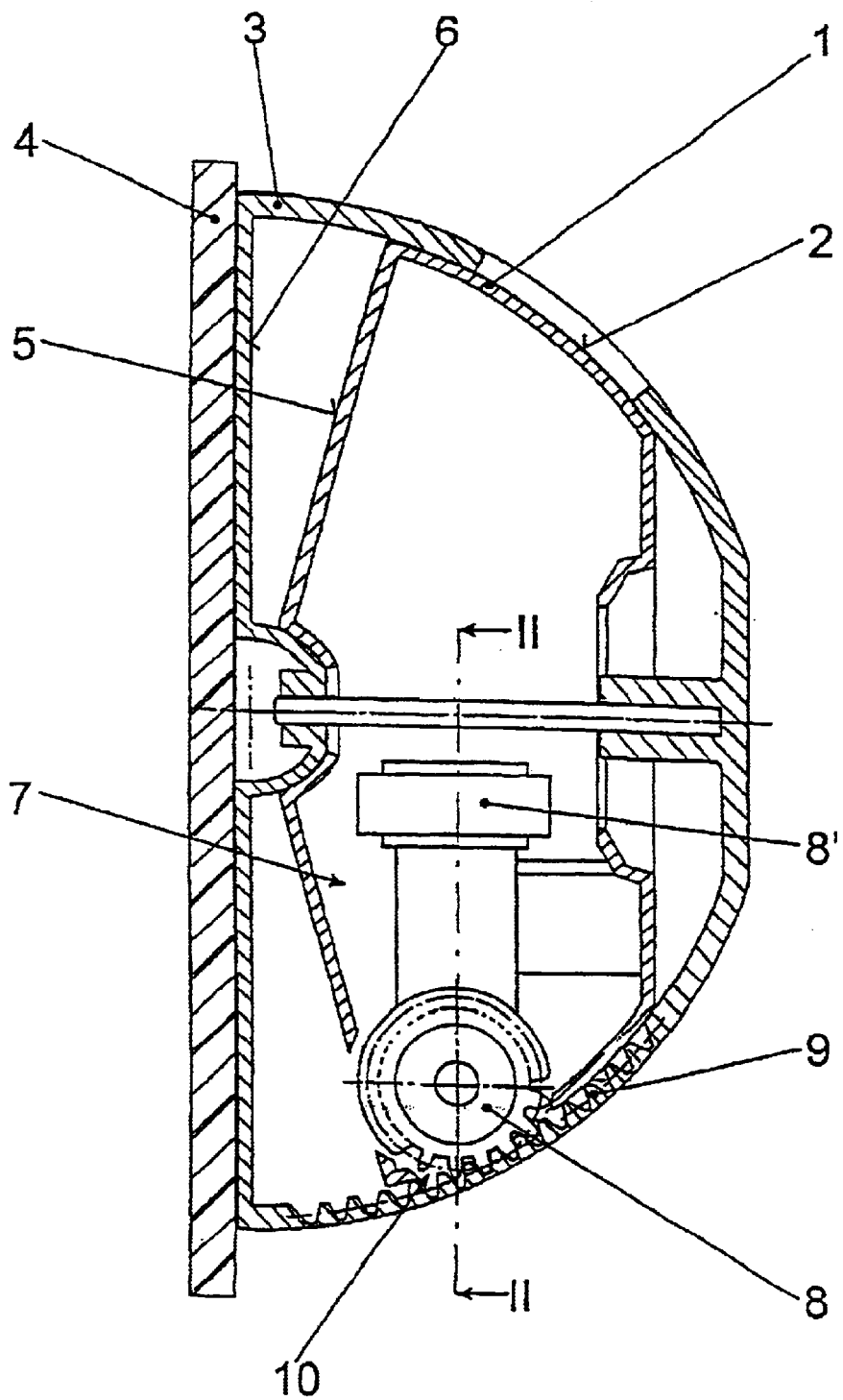
FIG. 1 a view of a rear-view mirror with the schematic representation of the drive device according to the invention, according to an embodiment of the invention, FIG. 2 a section corresponding to II—II according to FIG. 1, FIG. 3 a view corresponding to III in FIG. 2, of the slide resistor of the potentiometer in enlarged representation, the driving wheel having been removed, FIG. 4 a view corresponding to IV in FIG. 2 of the slider of the potentiometer according to the invention, in enlarged representation, the base portion having been removed, and FIG. 5 a view of the fixed portion of a drive device similar to FIG. 1, according to a further embodiment of the invention.

In FIG. 1 a portion of a vehicle rear-view mirror is shown in section, this rear-view mirror being described in detail at least partially in WO 98/31565, the disclosed content of which is hereby included.

Reference numeral 1 designates a drive housing in a shell shape, secured to the vehicle. This housing forms on the outside a spherical guide surface 2 for a mirror support 3, which may be pivoted to adjust the rear-view mirror around two imaginary axes and to which a mirror glass 4 is secured. The drive housing, secured to the vehicle, has an inclined terminating surface 5, which can also be a spherical surface. A drive device 7 to adjust the mirror, i.e. the mirror support 3 relative to the drive housing 1 is only indicated, necessary electromotors and gears are not represented. For these, reference is made to FIG. 5. The drive device 7 is secured in the drive housing 1 and has driving wheels 8, 8', which are driven by at least one electrometer via a gear system. One driving wheel 8 is provided for adjusting about the vertical axis and the other 8' for adjusting about the transverse axis. The driving wheels 8, 8' are toothed wheels which are actuated respectively by a toothed wheel, not shown, of the motor/gear unit. Both driving wheels 8, 8' are identical, so that in what follows no distinction will be made between them. The drive wheels 8 engage respectively with an internal toothing 9, which is formed on the inner surface of the ball socket-shaped mirror support, for which purpose the drive housing 1 has an opening 10. The mirror support 3 can be moved respectively relative to the drive housing 1 via the drive toothing 8, 9 until the inner wall 6 of the mirror support 3 pushes against the outer surface 5 of the drive housing 1. By this means, the end positions are given in respect of adjustment about the vertical axis and about the transverse axis. In order to adjust the position of the mirror according to desired given data, a control device is provided which controls the driving wheels 8, 8' via the motor/gear unit in dependence on position signals. For this purpose, potentiometers are provided as position sensors which supply electrical actual signals to the control device. The corresponding motors of the drive device are triggered until a stored desired position is achieved.

Figure 2:
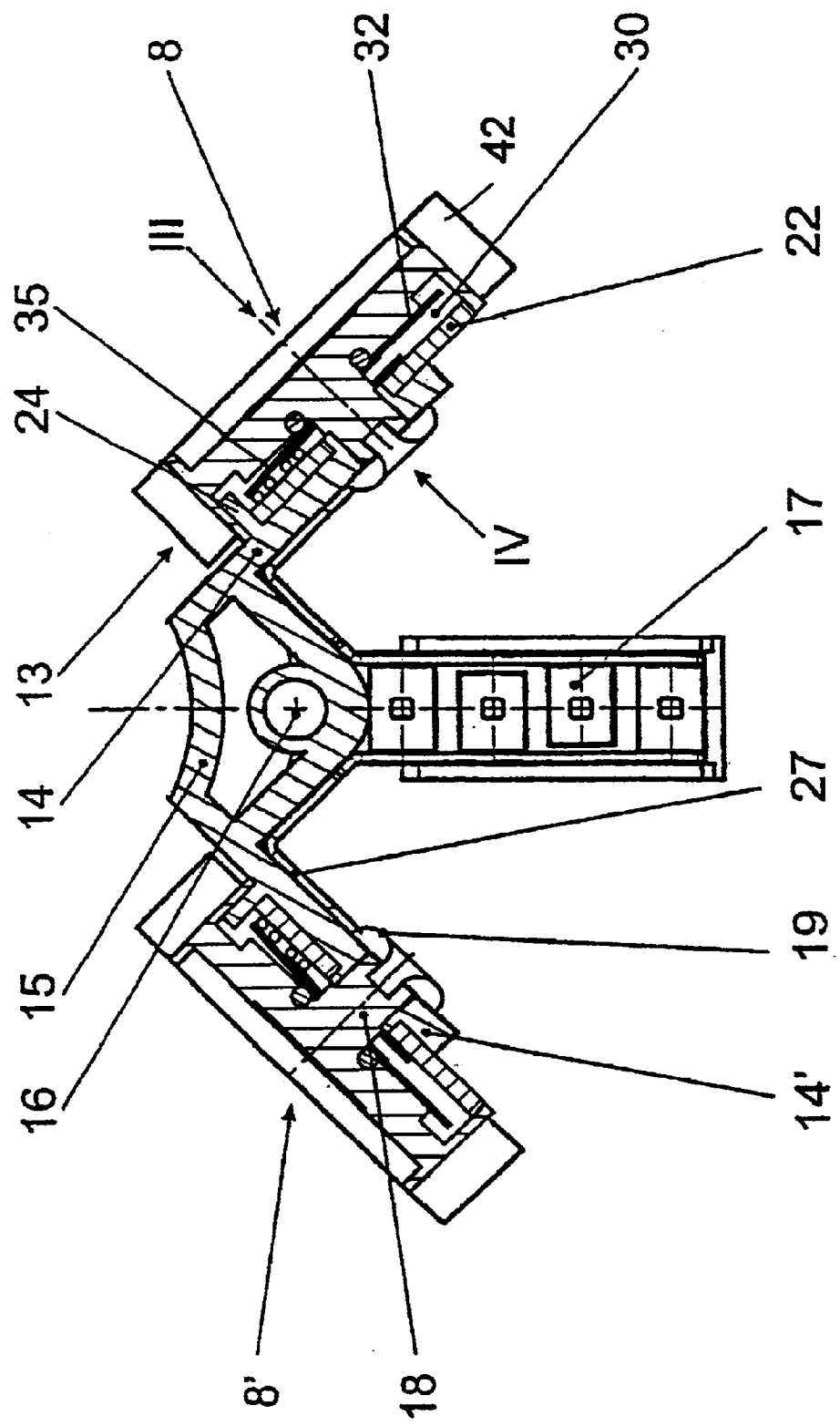

In FIG. 2 are the two driving wheels 8, 8' having a toothing 42, which wheels are arranged at a right angle to one another on account of the adjustment of the mirror about two axes. Each driving wheel 8, 8' is connected via a journal 18 to a base or foot portion 14, 14', secured to the housing, and mounted on same.

The base portions 14, 14' are a common component 15, for the securement of which in the drive housing a bore 16 is provided for a screw which is not represented. The common component 15 is provided with an extension 17 for electrical connections or contact points, which may be connected to the control system via electrical lines. The journal 18 of the respective driving wheel 8, 8' is rotatably mounted in the respective bore of the base portion 14, 14' and fixed axially by means of a border 19. Naturally other possible ways of fixing the driving wheels to the respective base portion 14, 14' are conceivable.

Between driving wheel 8, 8' and base portion 14, 14' is provided respectively a potentiometer 13 forming the position sensor, the driving wheel 8, 8' assuming the function of the swivel part of the potentiometer 13. The driving wheel 8, 8' has, on the side facing the base portion 14, 14', a depression 30 in which a sliding bow or slider 31 and a slide resistor 22, consisting of a circular plate formed from an insulating material and slideways, are accommodated. The slide resistor 22 and the slider 31 are represented in greater detail in FIGS. 3 and 4.

Figure 3:
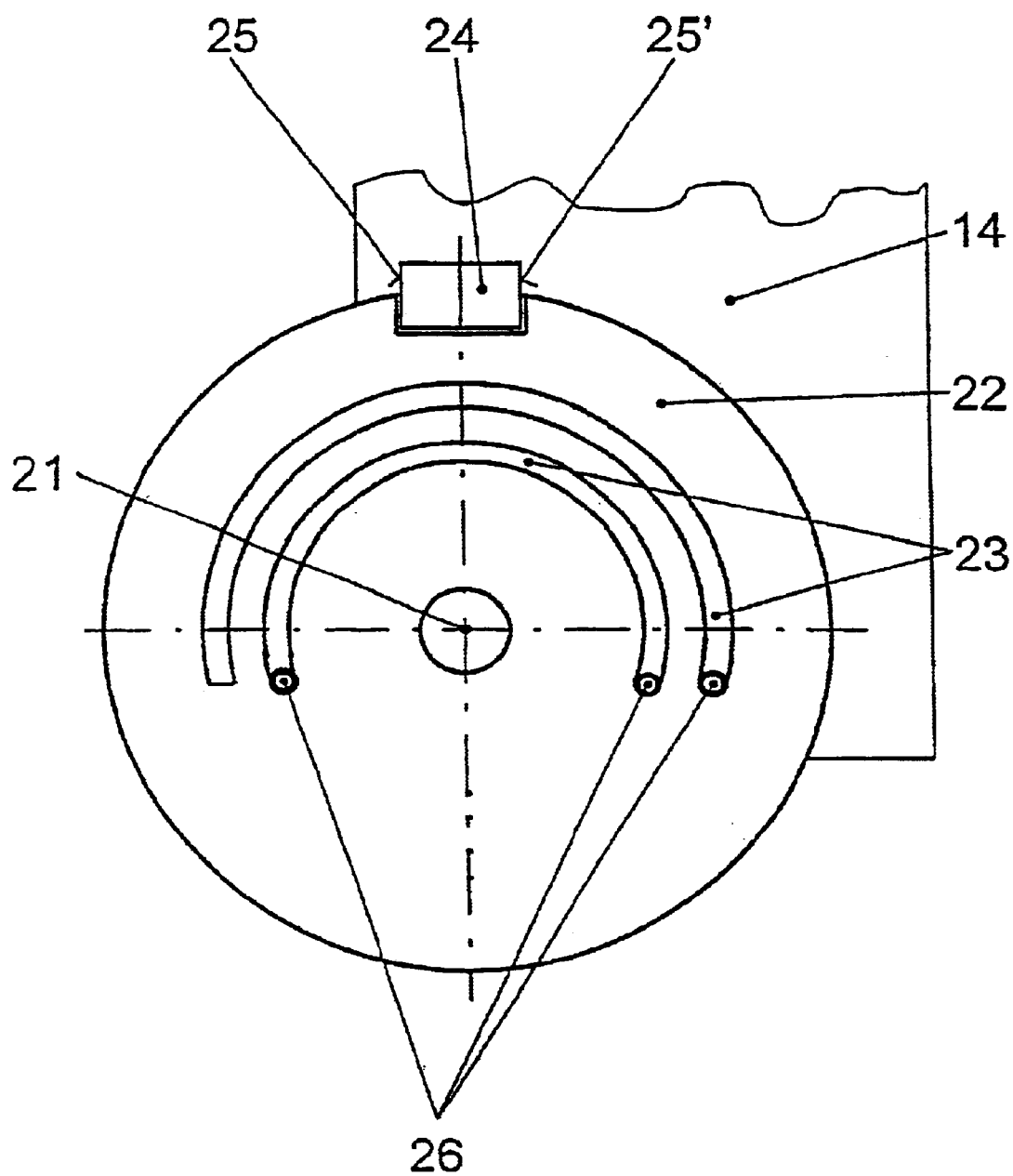

FIG. 3 shows a partial view of the base portion 14 with the driving wheel 8 taken away. To the base portion is secured the slide resistor 21, e.g. glued on. On the circular plate, made of the insulating material and having a central bore, are formed two arcuate slideways, which form resistors. For positioning the slide resistor 22 at the correct angle on the base portion 14, a stop boss 24 is integrally formed on the base portion 14, as can be recognized in FIG. 2. The slideways 23 are electrically connected to the electrical connections on the extension 17 via connection eyelets and connecting lines 27 realized as the contact, which can also be recognized in FIG. 2. As can be seen, the inner slideway has respectively at its ends connection eyelets, while the outer slideway 23 is provided only at one end with a connection eyelet. Thus three connecting lines 27 lead to respectively three electrical connections on the extension 17.

Figure 4:
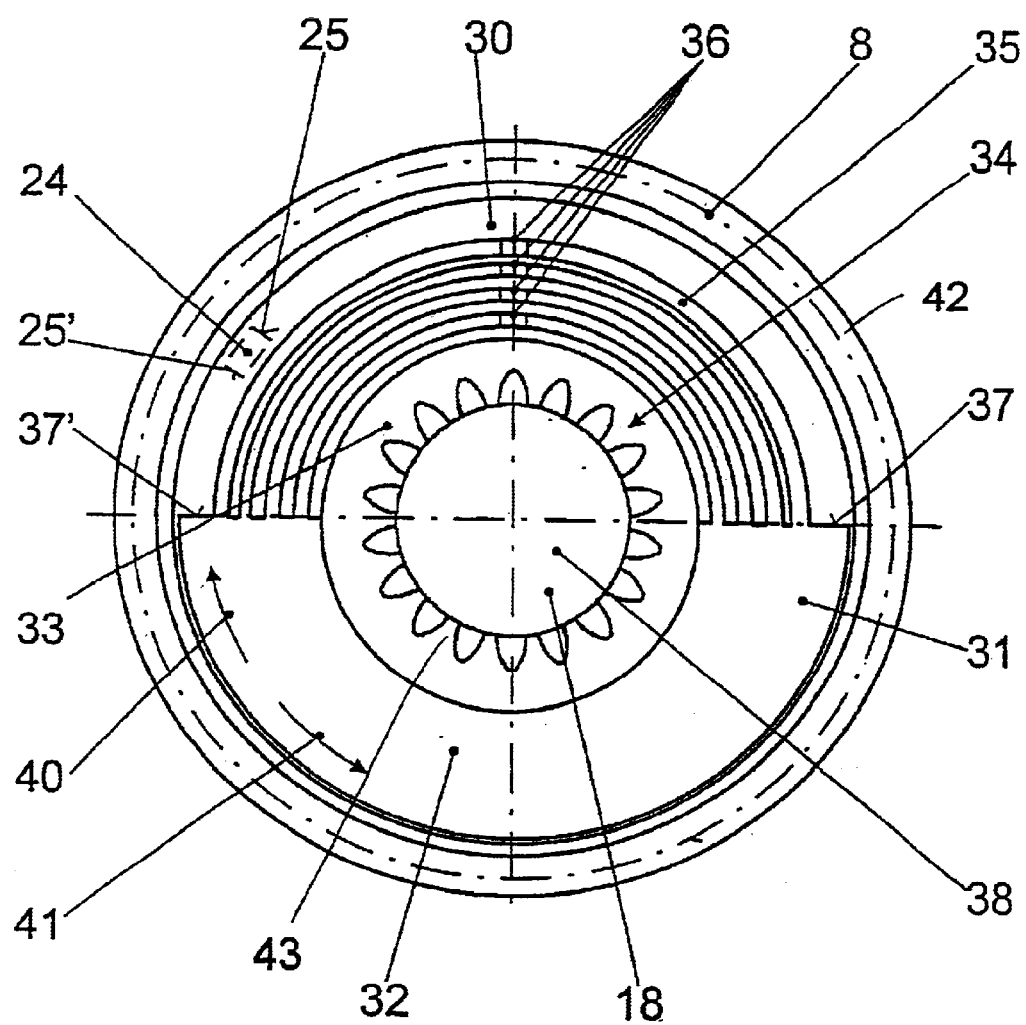

In FIG. 4, the driving wheel 8 is represented as seen from the base portion 14. On the outer perimeter the toothing 42 is provided, while the middle region, as described above, is depressed. Into the depression is inserted a sliding bow or sliding element 31. It consists of a metallic plate-shaped stamping which is circular in basic shape. The slider 31 has a flat, axially normal segment or a section 32 and arcuate spring bands 35, four in this embodiment, which are configured concentric and at a spacing from one another and merge into the continuous section 32. The spring bands 35 are provided centrally with contact knobs 36 of which respectively two slide on one of the slideways 23 of the slide resistor 22. For this purpose, the spring bands 35 are bent out of a plane of the segment or section 32 and thus have a resilient effect.

Because of the twisting of the slider 31 in respect of the slideways 13, the resistance value alters which may be measured at the electrical contacts and which is a measure for the position of the contact knobs on the slideways and thus a measure for the position of the mirror support in relation to the drive housing. As can be seen from FIG. 4, on the outer perimeter of the segment or section 32, at the transition region between segment and spring band, stops 37, 37' are formed by alteration of the outer radius of the section 32, whose angular spacing (here 1800) corresponds to the adjustment range of the driving wheel 8 and thus of the mirror.

The slider 31 or the stamping has a circular hole 38 through which the journal 18 can engage. Furthermore, a clamping disc 33 is arranged centrally, which also has a hole 38 and which fixes the slider 31. The clamping disc 33 is provided on its inner perimeter with an internal toothing 43, the teeth of which, as the slider 31 is fitted into the depression 30, press into the perimeter of the journal 18. The clamping disc 33 forms together with the journal 18 of the driving wheel 8 a slip clutch 34, i.e. through the internal toothing a connection is created between journal 18 and tightly clamped slider 31, which permits slipping through if one of the two stops 37, 37' hits one of the two counter-stops 25, 25', formed by the stop boss 24, of the base part 14. The clamping disc 33 was described above as a separate portion with internal toothing 43; naturally the slider can itself be provided centrally with internal toothing which forms together with the journal 18 the slip clutch 34.

The function of the potentiometer arises from the course of the method for calibrating same. First of all the potentiometer is mounted, the slider 31 being inserted at any angular position into the driving wheel 8. The journal 18 is here pushed through the bore 38 with the toothing 43 and the small teeth are pressed into the journal 18. Then the whole driving wheel 8 with its journal 18 is pushed onto the base portion 14 and is fixed axially by fitting the border 19 on the journal. The whole drive device 7, with the motor/gear unit not shown, is then installed in the drive housing 1 of the mirror, all the electrical connections are made and the mirror is completely mounted and possibly attached to the vehicle.

Thereupon or at some later time when the vehicle is operated for the first time, the mirror is brought by the normal actuation of the driver's seat, through which the motor/gear unit is provided with voltage, gradually into its two end positions. These are respectively reached when the outer surface 5 of the drive housing 1 abuts against the inner wall 6 of the mirror support 3. In this manner the calibration occurs automatically during first use and purely mechanically as follows:

when the extreme position of the mirror is driven to, which corresponds to a specific position of the driving wheel 8, the latter is twisted in relation to the stop boss fixed on the base portion 14. Because assembly has taken place in any position, the stop boss 24 (shown in a broken line in FIG. 4) is located in any position. If the driving wheel 8 is first turned clockwise according to arrow 40, stop 37' moves towards the counter-stop 25'. If it reaches the latter before the driving wheel 8 has reached its end position, the stop boss 24 will twist the sliding bow 31, overcoming the moment of the slip clutch 34, until the driving wheel 8 has reached its end position corresponding to the end position of the mirror. Thus the potentiometer is calibrated. If, however, the driving wheel 8 is turned anti-clockwise corresponding to direction arrow 41, it will reach its end position before stop 37 has come into contact with the counter-stop 25 of the stop boss 24. No calibration of the potentiometer is achieved. Since the position of the driving wheel in respect of the stop boss 24 is undetermined, it is necessary to travel to both end positions. Calibration takes place in one of the two. Since the adjustment range of the driving wheel 8 is fixed, only a single end position has to be traveled to for calibration.

Within the framework of the invention, the potentiometer can be designed differently from the embodiment described, in particular by movement or function reversal. Besides the drive device for a vehicle mirror, it can be used anywhere where a turning movement, limited from outside, has to be carried out and different swivel positions have to be entered in a controlled manner.

Figure 5:
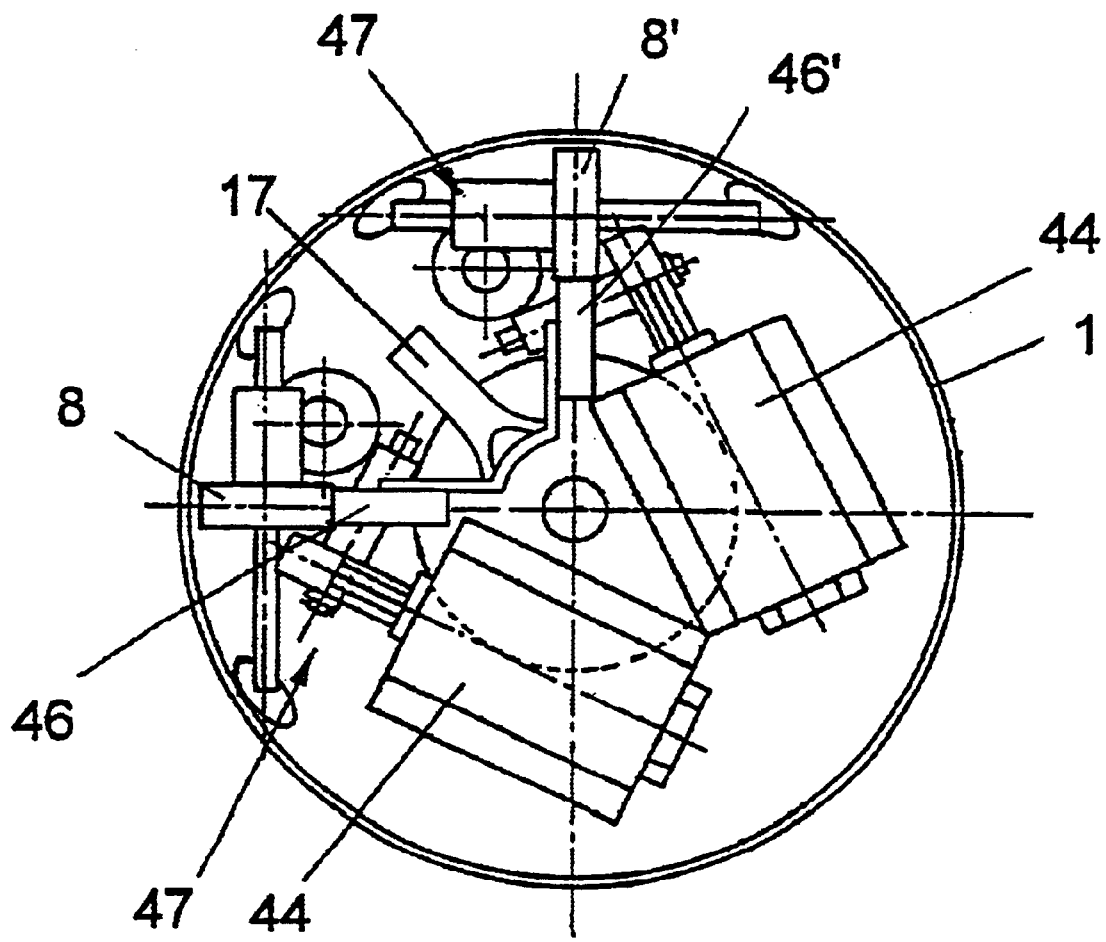

In FIG. 5 is represented a further embodiment, which shows in turn a drive 7 for a rear-view mirror; here a plan view corresponding to FIG. 1 is represented viewed from the left-hand side towards the drive housing 1 without terminating surfaces 5. Two electrometers 44 can be recognized which drive the driving wheels 8, 8' via a gear arrangement 47. In this embodiment, the driving wheels 8, 8' are not constituent parts of the above-described potentiometer, but separate toothed wheels 46, 46' are provided which are in engagement with the driving wheels 8, 8' and are turned by the latter. This means that in FIG. 2 the driving wheels 8, 8' have to be replaced by the toothed wheels 46, 46' forming the swivel part for the potentiometers; otherwise the structure is identical to that which has been described in conjunction with FIGS. 2 to 4.

What is claimed is:

1. A drive device for an adjustable vehicle mirror, comprising:
    a fixed portion;
    a mirror support pivotable relative to the fixed portion by means of at least one driving motor and at least one driving toothed wheel;
    a potentiometer to generate an electrical signal indicating the pivoting angle between the fixed portion and the mirror support, the potentiometer comprising,
        a slide resistor and a slider and one of the elements, slide resistor or slider, being securely connected to a base portion connected to the fixed portion and the other of the two elements being connected via a slip clutch to the driving toothed wheel or to a swivel part co-operating with the driving toothed wheel,
        the slipping moment of the slip clutch being greater than the moment of friction between the two elements,
        the driving toothed wheel or the swivel part being mounted rotatably on the base portion,
        one of the elements having two stops, whose angular spacing corresponds to the maximum pivoting angle between the fixed portion and the mirror support, and
        the other of the elements having two counter-stops co-operating with stops.

2. A drive device according to claim 1, wherein the slider is connected by means of the slip clutch to the driving toothed wheel or the swivel part, and the slide resistor is securely connected to the base portion and the base portion has a stop boss which cooperates with stops of the slider.

3. A drive device according to claim 1, wherein the swivel part is a toothed wheel engaging with the driving toothed wheel.

4. A drive device according claim 1, wherein the slider is a small metal plate which is round in basic shape, from which at least one arcuate band is bent out in order to achieve a spring action, the small metal plate being connected via the slip clutch to the driving toothed wheel or the swivel part.

5. A drive device according to claim 4, wherein on the outer perimeter of the slider, by discontinuous reduction of the radius of the small metal plate, are formed stops oriented substantially radially.

6. A drive device according to claim 1, wherein the slip clutch is formed by a central journal forming the rotational axis of the driving toothed wheel or swivel part, and an internal toothing, the internal toothing being a constituent part of a small metal plate forming the slider or of a clamping ring fixing the slider, and being pressed onto the journal.

7. A drive device according to claim 1, wherein two driving wheels or swivel parts are provided which are arranged in planes lying perpendicular to one another and their base portions are connected.

8. A drive device according to claim 1, wherein the fixed portion is configured shell-shaped and the pivotable mirror support surrounds the shell-shaped fixed portion at least partially, at least one toothing being formed in the inner surface of the mirror support, which toothing co-operates with the driving toothed wheel penetrating an opening in the shell-shaped fixed portion.

9. A drive device according to claim 8, wherein the at least one driving motor, the at least one driving toothed wheel, in case the swivel part and in case a gear inserted between drive motor and driving toothed wheel, as well as the at least one base portion are accommodated in the shell-shaped fixed portion.

10. A potentiometer for generating an electrical signal which determines an adjusting angle of a sub-assembly which is adjustable between two end positions, comprising:

a base portion having a slide resistor; a swivel part mounted on the latter via a pivot pin and having a slider, which swivel part co-operates with the adjustable sub-assembly, the slider consists of a small metal plate which is circular in basic shape and on the perimeter of which are formed, by altering the radius, stops aligned substantially radially, which predetermine the two end positions of the adjustable sub-assembly, wherein the slider is pressed onto a journal either directly or using a clamping ring, in such a way that the journal and slider or clamping ring form a slip clutch, the slipping moment of which is greater than the moment of friction between the slider and the slide resistor.

11. A potentiometer according to claim 10, wherein the slider includes at least one sliding element which slides on at least one resistance path of the slide resistor and is formed as at least one arcuate spring band, which is worked out of the small metal plate and is bent resiliently out of the plane of the small metal plate.

12. A potentiometer according to claim 11, wherein the small metal plate or clamping ring is provided with an internal toothing which comes into engagement with the journal when pressed on, to form the slip clutch.

13. A potentiometer according to claim 11, wherein a plurality of arcuate spring bands are provided concentrically at a spacing from one another.

14. A potentiometer according to claim 10, wherein the swivel part is a toothed wheel which is configured as the driving toothed wheel of the adjustable sub-assembly or is in engagement with a driving toothed wheel of the adjustable sub-assembly.

15. A potentiometer according to claim 10, wherein the base portion has a stop boss which co-operates with the stops of the slider.

16. A potentiometer according claim 10, wherein the swivel part has a depression into which the slider is inserted and in that the slide resistor is attached to a round plate-shaped support formed from insulating material, which is securely connected to the base portion.

17. A potentiometer according to claim 10, wherein the electrical connections to the slide resistor and the connection contacts are arranged on the base portion.

18. A drive device for an adjustable vehicle mirror, comprising:

a fixed portion;

a mirror support pivotable relative to the fixed portion by means of at least one driving motor, and at least one driving toothed wheel;

a potentiometer to generate an electrical signal indicating the pivoting angle between the fixed portion and the mirror support, the potentiometer having a slide resistor and a slider and one of the elements, slide resistor or slider, being connected to the fixed portion and the other of the two elements being connected to the driving toothed wheel or to a swivel part co-operating with the driving toothed wheel, the fixed portion being shell-shaped and the pivotable mirror support surrounding the shell-shaped fixed portion at least partially, and at least one toothing being formed in the inner surface of the mirror support, which toothing co-operates with the driving toothed wheel penetrating an opening in the shell-shaped fixed portion.

19. A drive device according to claim 18, wherein two driving wheels or swivel parts are provided which are arranged in planes lying perpendicular to one another and having two associated potentiometers.

20. A drive device according to claim 19, wherein two driving motors, two driving toothed wheels, in case two swivel parts and a gear inserted between each drive motor and each driving toothed wheel, and the potentiometers are accommodated in the shell-shaped fixed portion.

* * * * *